United States Patent Office 3,525,396
Patented Aug. 25, 1970

3,525,396
ALTERNATE GAS AND WATER FLOOD PROCESS FOR RECOVERING PETROLEUM
Ju-Nam Chew, Dallas, Tex., assignor to Mobil Oil Corporation, a corporation of New York
No Drawing. Filed Dec. 26, 1968, Ser. No. 787,216
Int. Cl. E21b 43/18, 43/20
U.S. Cl. 166—263                    6 Claims

ABSTRACT OF THE DISCLOSURE

The specification discloses a process for recovering petroleum from a reservoir which is unable to maintain an economic level of production due to partial depletion by primary production or due to unfavorable, initial reservoir conditions. The process comprises injection of inert gas into the reservoir and producing same while maintaining back pressure on the production system. At gas breakthrough, injection of gas is stopped and the reservoir is produced until production declines to an uneconomical rate. Water is then injected under the same injection and back pressures as those used in the gas injection cycle until water breaks through at the production system. The water injection is stopped and the reservoir is produced until production drops below an economical rate. The above alternate gas-water cycles can be then repeated until production becomes uneconomical.

BACKGROUND OF THE INVENTION

The present invention relates to a process for recovering petroleum from subterranean formations and more particularly to an improved process of alternately injecting gas and water into a reservoir for recovery of petroleum or like minerals therefrom.

It is well known in the oil industry that so-called secondary recovery processes are employed to produce additional volumes of gas and oil from a subterranean reservoir after production by primary means has declined to an uneconomical level. The more commonly known secondary recovery procedures involve injecting either gas or water into a partially depleted reservoir through an injection system to drive oil or the like toward a production system from which the oil is produced along with portions of the driving fluid. When the ratio of driving fluid to oil reaches an uneconomical level, the reservoir is normally abandoned, even though a substantial amount of residual oil still remains in the reservoir.

It has recently been recognized that greater recovery efficiencies can be obtained by flooding with both gas and water in a single recovery operation. It is theorized that by injecting gas before or after a waterflood, a gas saturation can be established within the reservoir wherein slugs of "trapped gas" will occupy space within the reservoir which otherwise would contain trapped oil. This inherently reduces the amount of trapped or residual oil present in the reservoir and accordingly provides greater recovery. However, previously where gas was introduced prior to a waterflood, it was introduced in small slugs and alternated with small slugs of water wherein essentially a simultaneous gas-water flood occurred. Since the gas and water became mixed in the immediate vicinity of the injection well, the benefits normally obtained from establishing a free-gas phase in the reservoir were effectively lost.

Other alternate-flood processes have been proposed for obtaining additional amounts of residual oil from a reservoir at the conclusion of a normal waterflood. One such procedure is disclosed in U.S. Pat. No. 3,123,134, issued Mar. 3, 1964, and involves injecting gas into a watered-out reservoir in quantities and at a pressure sufficient to establish a free-gas phase therein. The gas is normally injected through injection wells while a suitable back pressure is maintained on production wells. When the desired gas phase is established in the reservoir, the injection wells are closed and the production wells are allowed to flow. After substantially no more oil can be recovered or the production rate has declined to an undesirably low level, the process may be repeated by re-establishing the high pressure free-gas phase and subsequently reducing the pressure while producing said reservoir. The alternate steps are continued until production becomes uneconomical. After the initial waterflooding operations, no additional water is injected into the reservoir but, instead, the process relies solely upon gas as the driving medium.

Another procedure of recovering oil from watered-out reservoirs is disclosed in U.S. Pat. No. 3,244,228, issued Apr. 5, 1966, and involves alternately flooding the reservoir with gas and water. Gas is injected into a watered-out reservoir or the waterflooded portion of an existing waterflooding operation until a desired gas saturation exists in the reservoir. Water is then injected and the gas-water injection cycles repeated until the water-oil ratio becomes uneconomical. In both of the above-mentioned processes the reservoir under production is waterflooded prior to the injection of a gas.

SUMMARY OF THE INVENTION

The present invention provides an improved process for recovering petroleum from a subterranean reservoir wherein a free-gas phase is established in the reservoir prior to any waterflooding operations and involves alternately flooding the reservoir with inert gas and water in such a way that the overall recovery of oil is increased. More specifically, the process of the present invention is as follows.

In a reservoir that is unable to maintain an economical production level due to partial depletion due to primary production or to unfavorable reservoir conditions, inert gas is injected through an injection system into said reservoir. The gas is injected at a relatively high pressure which preferably approaches or exceeds the pressure which originally existed in the reservoir. The reservoir is produced during gas injection but a substantial back pressure is maintained on the production system. When inert gas breaks through at the production system, the injection system is closed and the reservoir is allowed to produce until the production rate declines to an undesirably low value.

Water is then injected through the injection system while back pressure is maintained on the production system until water breaks through at the production level. Injection of water is ceased and production is continued until the production rate declines to an uneconomical rate. At this time, the above alternate gas and water injection cycles may be repeated until the amount of oil recovery is no longer economical. The actual operation and the apparent advantages of the invention will be better understood by referring to the following detailed description.

DESCRIPTION OF THE PREFERRED EMBODIMENT

The present invention provides an improved recovery process for recovering petroleum from reservoirs which have undergone primary production by pressure decline or pumping or from virgin reservoirs which are unable to produce due to initial low, reservoir pressure or low, gas saturation. To be more explicit, the present process is carried out in a "recovery zone" of an oil-bearing reservoir such as described above. As will be understood by those skilled in the art, the term "recovery zone" as used herein and in the appended claims means that portion of a reservoir through which oil is displaced from an injection system to the production system by an injected fluid. The injection and production systems may comprise one or more wells extending from the surface of the earth into the recovery zone and such wells may be located and spaced from one another in any desired pattern. For example, the so-called "line flood" pattern may be utilized, in which case the injection and production systems comprise rows of wells spaced from one another. In this type pattern the recovery zone as defined by the spaced rows of injection and production wells generally will be that portion of the reservoir underlying the area between these spaced rows. Exemplary of other patterns which may be used is the so-called "circular flood" pattern in which the injection system comprises a central injection well and the production system a plurality of production wells spaced radially about the injection well. Of course, the injection and production systems each may consist of only a single well in which case the recovery zone as defined by the spaced injection and production wells will be the portion of the reservoir underlying a generally elliptical area between these wells which is subject to the displacing action of the injected flooding medium. The above and other patterns are well known to those skilled in the art and for a more detailed description of such patterns, as well as flood techniques in general, reference is made to Uren, L. C., Petroleum Production Engineering—Oil Field Exploitation, 2nd Ed., McGraw-Hill Book Company, Inc., New York and London, 1939, and more particularly to the section entitled, "The Water Flooding Process," appearing at pages 444–459.

It also will be recognized that the invention may be carried out utilizing one or more dually completed injection-production wells of the type, for example, disclosed in U.S. Pat. No. 2,725,106. This arrangement sometimes may be utilized to advantage in a relatively thick oil reservoir in which it may be desirable to displace the oil in the reservoir upwardly and recover such oil from the upper portion of the reservoir. In this instance, the injection system normally would comprise the lower completion interval of one or more dually completed wells of the type described in the aforementioned Pat. No. 2,725,106 and the production system would comprise the upper completion interval of one or more of such wells. In this case, of course, the recovery zone would be that portion of the reservoir subject to the displacing action of the flooding medium as it moves upward through the reservoir.

In carrying out the invention, inert gas, e.g., air, nitrogen, flue gas, carbon dioxide, combinations thereof, etc., is injected at a relatively high injection pressure through an injection system into the recovery zone of a reservoir that is unable to maintain an economical production level. This lack of production may be due to partial depletion of a reservoir by primary production or may be due to certain unfavorable, initial reservoir conditions of a virgin reservoir, e.g., low, initial reservoir pressure or low, initial gas saturation. Preferably, the injection pressure approaches or exceeds the pressure which originally existed in the reservoir prior to any recovery therefrom. Since a virgin reservoir will normally be at its original pressure at the commencement of the present invention, the injection pressure will have to exceed this value in order for the gas to flow into the reservoir formation. The actual chracteristics of a particular reservoir, e.g., fracture gradient, will predict the actual injection pressure since the injection pressure should be low enough to prevent fracturing of the reservoir formation.

The recovery zone is produced from a production system during gas injection but back pressure is maintained on the production system so that a free-gas phase may be established in the recovery zone and so that the overall pressure within the recovery zone can be increased. Preferably, the back pressure is in excess of 25% of the injection pressure. Values lower than this normally will not allow the pressure within the formation to increase significantly, nor will they allow the desired gas saturation to be established within the recovery zone. The latter is desired in order to allow gas to diffuse into the trapped oil thereby aiding in future recovery. Also, the back pressure should not normally exceed 75% of the injection pressure since higher back pressures will seriously restrict desired production during the injection of the inert gas. When inert gas breaks through at the production system, the injection system is closed and the recovery zone is allowed to produce until the overall pressure of the recovery zone declines to a value substantially equal to the set back pressure or until the production rate declines to an undesirably low value.

When the pressure at the injection system declines to this value approaching the set back pressure or when production is no longer economical, water is injected through the injection system into the recovery zone. The term "water" as used herein can include any flooding liquid normally used in waterflooding operations, e.g., fresh water, brines, water with or without additives, such as thickeners, emulsions, etc. Water is injected at an injection pressure which is substantially equal to the injection pressure used in the gas injection step. Likewise, a back pressure of approximately the same value as that used in the gas injection step, is maintained on the production system during water injection. When water breaks through at the production system, injection of water is ceased and production is continued until the pressure within the recovery zone declines to a value substantially equal to the set back pressure, or until the production rate declines to an undesirably low value. At this time, the above alternate gas and water injection cycles may be repeated until the amount of oil recovered is no longer economical.

To illustrate further the present invention, reference is made to a series of laboratory experiments which were carried out to compare the recovery obtained by using the present invention to that of other alternate gas-water flood processes which are similar but which vary in certain actual operational steps. The experiments were run in a Hassler-type cell on 2-inch diameter by 1-foot long cylindrical cores of Berea sandstone which had the following characteristics: porosity=18.4%; pore volume=110 milliliters; permeability=95 millidarcies; and the axis of the core along the bedding plane.

The initial oil saturation in each core was established by first completely saturating the core with a 5% salt-water solution and then injecting oil (kerosene) into the core until the fluid being produced contained less than 1% water. The volume of oil retained in the core was equal to the volume of water produced after corrections for fluid in lines and fittings were made. The oil flood was made under the same pressure conditions as those chosen for subsequent steps in a particular run.

One experiment (designated Process A below) simulated an alternate gas-water flood in accordance with the present invention. Inert gas (nitrogen) was injected into an oil-saturated core while a 50% back pressure was maintained at the production end. At gas breakthrough, the core was produced until the overall pressure in the core was within 20 p.s.i. or 10% of equalling the back pressure. Water was then injected while the same set back pressure was maintained on the core until water breakthrough, after which the core was produced down near to the set back pressure. The alternate cycles were then repeated. Another experiment (Process B) simulated an alternate gas-water flood similar to Process A, described above, except there was no back pressure maintained on the core during the experiment. A third experiment (Process C) simulated an alternate gas-water flood which was similar to Process A except it included a pulse step between the gas and water injection steps. In the pulse step, the production system was closed at gas breakthrough, but gas injection was continued until the pressure at the production system was substantially equal to the injection pressure; then the injection system was closed and the core was produced by blowdown. Average results of each process are summarized in the following table.

|  | Process A (4 runs) | Process B (3 runs) | Process C (3 runs) |
|---|---|---|---|
| Initial saturations, percent pore volume: | | | |
| Oil | 52.4 | 51.4 | 52.7 |
| Water | 47.6 | 48.6 | 47.3 |
| Gas | 0.0 | 0.0 | 0.0 |
| Residual saturations after 4 gas steps alternated with 3 water steps: | | | |
| Oil | 19.6 | 22.1 | 24.5 |
| Water | 48.4 | 49.9 | 45.9 |
| Gas | 32.0 | 28.0 | 29.6 |
| Oil recovery, percent original oil in place | 62.6 | 57.0 | 53.4 |

Process A: Alternate gas and water injection without initial waterflood—with back pressure (pressures: Injection=400 p.s.i.g., production=200 p.s.i.g.).
Process B: Alternate gas and water injection without initial waterflood—no back pressure (pressures: Injection=300 p.s.i.g., production=0 p.s.i.g.).
Process C: Alternate gas and water injection without initial waterflood with pulse step (pressures: Injection=300 p.s.i.g., production=0 p.s.i.g.).

In comparing the above results, it can be seen that the process of the present invention which maintained a set back pressure on the production end of the core recovered a greater percentage of oil from a saturated core than the other similar alternate gas-water floods which did not maintain back pressure at the production end.

I claim:
1. A process for recovering petroleum from a recovery zone of a reservoir which is unable to sustain an economical level of production due to partial depletion by primary production or due to unfavorable, initial reservoir conditions, said recovery zone having an injection system and a production system, said process comprising:
  injecting inert gas at an injection pressure into said recovery zone through said injection system while maintaining a back pressure on said production system, said back pressure being at a value to allow production from said recovery zone during the injection of inert gas;
  closing said injection system when said inert gas breaks through at said production system and continuing to produce said recovery zone through said production system until the production rate drops below an economical level; and
  opening said injection system and injecting water therethrough until water breaks through at said production system.

2. The process of claim 1 wherein: said water is injected at an injection pressure substantially equal to said injection pressure of said inert gas and a set back pressure is maintained on said production system which is substantially equal to that maintained during the inert gas injection.

3. The process of claim 2 including: closing said injection system when said water breaks through at said production system and continuing to produce said recovery zone until production declines to an uneconomical rate.

4. The process of claim 3 wherein: said back pressure at said production system equals a value of from 25% to 75% of said injection pressure in both the gas and the water injection steps.

5. The process of claim 3 wherein: said injection pressures of both said inert gas and said water are substantially equal to or in excess of the original pressure existing in said recovery zone.

6. The process of claim 3 including: repeating the above alternate gas and water injection steps when the production rate at the end of said water injection steps declines to an uneconomical level.

References Cited

UNITED STATES PATENTS

| 3,032,101 | 5/1962 | Woertz et al. | 166—263 |
| 3,065,790 | 11/1962 | Holm | 166—274 |
| 3,123,134 | 3/1964 | Kyte et al. | 166—263 |
| 3,244,228 | 4/1966 | Parrish | 166—274 X |

ERNEST R. PURSER, Primary Examiner

I. A. CALVERT, Assistant Examiner

U.S. Cl. X.R.

166—274